US006332908B1

United States Patent
Lee et al.

(10) Patent No.: US 6,332,908 B1
(45) Date of Patent: Dec. 25, 2001

(54) METHOD FOR MODIFYING SURFACE OF HYDROGEN STORAGE ALLOY FOR NI/MH SECONDARY BATTERY USING FLAKE TYPE METAL

(75) Inventors: Jai Young Lee; Ji Sang Yu; Seoung Hoe Kim; Sang Min Lee; Ho Lee; Jeong Gun Park, all of Daejeon Kwangyeok-si (KR)

(73) Assignee: Korea Advanced Institute of Science and Technology, Kwangyeok-si (KR)

( * ) Notice: Subject to any disclaimer, the term of this patent is extended or adjusted under 35 U.S.C. 154(b) by 0 days.

(21) Appl. No.: 09/692,446

(22) Filed: Oct. 20, 2000

(30) Foreign Application Priority Data

Nov. 19, 1999 (KR) .................................................. 99-51580

(51) Int. Cl.[7] ....................................................... B22F 1/00
(52) U.S. Cl. ................................................................ 75/255
(58) Field of Search .............................. 75/255, 351, 352

(56) References Cited

U.S. PATENT DOCUMENTS

| | | | |
|---|---|---|---|
| 5,916,381 | * 6/1999 | Sapru et al. | 148/403 |
| 5,951,945 | * 9/1999 | Komada et al. | 420/900 |
| 5,962,165 | * 10/1999 | Tsuruta et al. | 429/218.2 |
| 6,030,724 | * 2/2000 | Sawa et al. | 429/218.2 |
| 6,040,087 | * 4/2000 | Kawakami | 429/218.1 |
| 6,143,052 | * 11/2000 | Kiyokawa et al. | 75/230 |
| 6,193,929 | * 2/2001 | Ovshinsky et al. | 420/402 |
| 6,270,719 | * 8/2001 | Fetcenko et al. | 420/588 |

* cited by examiner

*Primary Examiner*—Ngoclan Mai
(74) *Attorney, Agent, or Firm*—Rosenberg, Klein & Lee

(57) ABSTRACT

Disclosed is a method for modifying a surface of a hydrogen storage alloy for an Ni/MH secondary battery using flake type metal comprising the steps of ball-milling metal powder to produce flake type metal powder; and ball-milling the flake metal powder together with hydrogen storage alloy powder to obtain mixture powder. The method according to the present invention provides the hydrogen storage alloy capable of increasing discharge capacity of an electrode and lengthening electrode life duration for the Ni/MH secondary battery.

7 Claims, 4 Drawing Sheets

METHOD FOR MODIFYING SURFACE OF HYDROGEN STORAGE ALLOY FOR NI/MH SECONDARY BATTERY USING FLAKE TYPE METAL

BACKGROUND OF THE INVENTION

1. Field of the Invention

The present invention relates to a method for modifying a surface of a hydrogen storage alloy, and more particularly to a method for modifying a hydrogen storage alloy for an Ni/MH (nickel-metal hydride) secondary battery using flake type metal powder to enhance discharge capacity of an electrode and to lengthen electrode life duration.

2. Description of the Related Art

A hydrogen storage alloy refers to a metal or an alloy capable of absorbing or discharging hydrogen reversibly at a certain temperature and a certain pressure, and it must have large storage capacity of hydrogen being reversibly available and exhibit high hydrogenation velocity in an electrolyte in order to be applied in practice to an electrochemical battery.

Such a hydrogen storage alloy is used in, for example, a negative electrode of an electrochemically rechargeable battery whose positive electrode is typically made of nickel hydroxide material. A rechargeable secondary battery of this type is commonly referred to as "a nickel-metal hydride (Ni/MH) secondary battery" due to the nickel hydroxide positive electrode and the hydride nature of the negative electrode metal.

The hydrogen storage alloys for the Ni/MH secondary battery developed so far can be largely divided into three types: (1) $AB_5$ type including La—Ni and Mn—Ni based alloys, wherein A is an element having a strong affinity for hydrogen, for example, alkali earth metal, such as, La, Ti, Zr, Ce, Pr, Nd, etc., and B is a transition element or a transition metal, such as, Ni. Mn, Co, Fe, Al, etc.; (2) $AB_2$ type including Zr—Ni and Ti—Ni based alloys; and (3) AB type including V—Ti based alloys. The first $AB_5$ type has a drawback in its low energy storage density while the second $AB_2$ type is poor in nearly all of its performances. Also, in spite of its largest hydrogen storage capacity, the third AB type still has a problem in its incapability of charging/discharging in an alkali aqueous solution. Thus, in order to cope well with coming development of a high capacity and high performance Ni/MH secondary battery, it is necessary to precede researches for realizing high performances of the $AB_2$ or AB type hydrogen storage alloys in which higher capacity is guaranteed than in the $AB_5$ type hydrogen storage alloys.

In general, on a surface of the hydrogen storage alloy electrode is formed an oxide film which causes reduction of activated materials and acts as a barrier to the absorbance/discharge of hydrogen. This results in deterioration of every performance of alloy due to increases of contact resistance and charge transfer resistance. In the end, the oxide film becomes a major factor that reduces the discharge capacity and degrades the life duration of electrode.

To solve the above-mentioned problems, there have been developed various techniques for improving of surface characteristics of the hydrogen storage alloy, such as, an alloy design technique, an alloy surface-coating/etching technique, a surface characteristic-improving technique by means of additives, and a surface-modifying technique using a ball milling. The alloy design technique, however, has a difficulty in designing the alloy to maintain its thermodynamic characteristic, i.e., its large hydrogen storage capacity and at the same time to have excellent surface characteristics. Also, the alloy surface-coating/etching technique not only requires additional processes due to use of solutions, but is scarcely applied in practice because it is inevitably performed under a noxious atmosphere. On contrary, the surface characteristic-improving technique by means of additives and the surface-modifying technique using a ball milling are advantageous in that they can enhance all of the performances only by modifying the alloy surface without having an influence on the thermodynamic characteristic of the alloy. In connection with this, it is reported by M. A. Fetcenko et al., J. Electrochemical Society, 15 (1991) that nickel is necessary material for these surface-modifying or surface characteristic-improving techniques. Since the report, there have been proposed a technique using nickel as an additive in production of an electrode or a ball milling technique using nickel powder. Nevertheless, these surface-modifying techniques using normal type of nickel did not succeed in enhancing efficiency by lack of uniform contact of the nickel on the alloy surface.

SUMMARY OF THE INVENTION

Accordingly, the present invention has been made to overcome the above-mentioned problems, and it is an object of the present invention to provide a novel method for modifying a surface of a hydrogen storage alloy for an Ni/MH secondary battery using flake type metal powder having larger surface area over ordinary sphere type metal powder to improve surface characteristics of the alloy, thereby enhancing all performances of an electrode as well as increasing discharge capacity and life duration thereof.

To achieve this object, there is provided a method for modifying a surface of a hydrogen storage alloy for an Ni/MH secondary battery using flake type metal in accordance with an aspect of the present invention, the method comprising the steps of:

ball-milling metal powder to produce flake type metal powder; and ball-milling the flake type metal powder together with hydrogen storage alloy powder to obtain mixture powder.

The present invention is directed to the improvement of surface characteristics of the above-mentioned $AB_2$ or AB type hydrogen storage alloys.

Nickel, copper, palladium, chrome and other commonly used metal can be preferably used as raw material of the flake type metal in producing the flake type metal powder according to the present invention without any limitation of its shape. More preferably, the flake type metal powder is nickel powder.

This flake type metal powder functions as a catalyst that is required for charge/discharge of the hydrogen storage alloy in an electrolyte.

Because of larger contact area of the flake type metal powder than that of conventional metal powder (metal powder of any other type than the flake type, e.g., sphere type metal powder), use of the flake type metal powder according to the present invention offers significant advantages over use of the conventional type metal powder.

Also, it is preferred that the hydrogen storage alloy is a Zr based alloy or a Ti based alloy, particularly, a V—Ti based alloy, and is added as a current collector in producing the hydrogen storage alloy electrode.

Now, a description will be given for a method of producing the flake type metal powder according to the present invention.

In accordance with the present invention, the flake type metal powder is produced by means of a ball milling technique. A ball mill to be used in the technique is preferably a SPEX mill or an attrition mill. If raw material of the metal powder is put into the SPEX mill or the attrition mill and then the ball milling is performed, the powder collides with the balls to generate heat and so to proceed mechanical alloying owing to the heat. Since the flake type metal powder produced by the ball milling technique is characterizes in that a particle size is increased in proportional to a time of ball milling, any size of the metal powder is properly selected in accordance with an intention of use of the relevant alloy.

According to the present invention, any technique can be used as a technique for adding the flake type metal powder with a view to modifying the surface of the hydrogen storage alloy, including a case of mixing the flake type metal powder with the hydrogen storage alloy powder and then ball-milling the mixture powder in the SPEX mill, a case of adding the flake type metal powder as a current collector during production of a pellet-type or paste-type electrode and so forth.

BRIEF DESCRIPTION OF THE DRAWINGS

The above objects, and other features and advantages of the present invention will become more apparent from the following detailed description in conjunction with the drawings, in which.

DETAILED DESCRIPTION OF PREFERRED EMBODIMENTS

Hereinafter, preferred embodiments of a method for modifying a surface of a hydrogen storage alloy according to the present invention will be described with reference to the accompanying drawings. Since these embodiments are given only for the purpose of description, it will be apparent by those skilled in the art that the present invention is not limited to these embodiments and the scope of the invention covers equivalent scope including the embodiments.

1. Production of Flake Type Metal (Nickel)

Flake type nickel was prepared by the following two manners: (1) nickel powder of 30 g was put into a SPEX mill, a weight ratio between the nickel powder and balls was adjusted to 1:1 and then ball milling was performed for 2 hours to produce flake type nickel powder according to the present invention; and (2) nickel powder of 100 g was put into an attrition mill, a weight ratio between the nickel powder and the balls was adjusted to 15:1 and then ball milling was performed for 1 hours to produce the flake type nickel powder.

2. Test of Surface Characteristics of a Ti Based Alloy

Normal type nickel (mainly consisting of sphere type nickel) and the flake type nickel produced as stated above were mixed with a $Ti_{0.9} Zr_{0.2} Mn_{0.5} V_{0.5} Ni_{0.8}$ alloy of 3 g in quantity of 10% by weight, respectively, a weight ratio between the powder and the balls in each of the mixture powders was adjusted to 3:1 and then each of the mixture powders was separately ball-milled for 25 minutes in a SPEX mill to obtain an alloy. Two Pellet-type electrodes were produced using the respective resulting alloys, respectively. At this time, PTFE of 0.02 g was added as a binder to the alloy by the alloy of 0.2 g during the production of the electrode. The flake type nickel is also added as a current collector of the electrode to the alloy.

Figure 1:
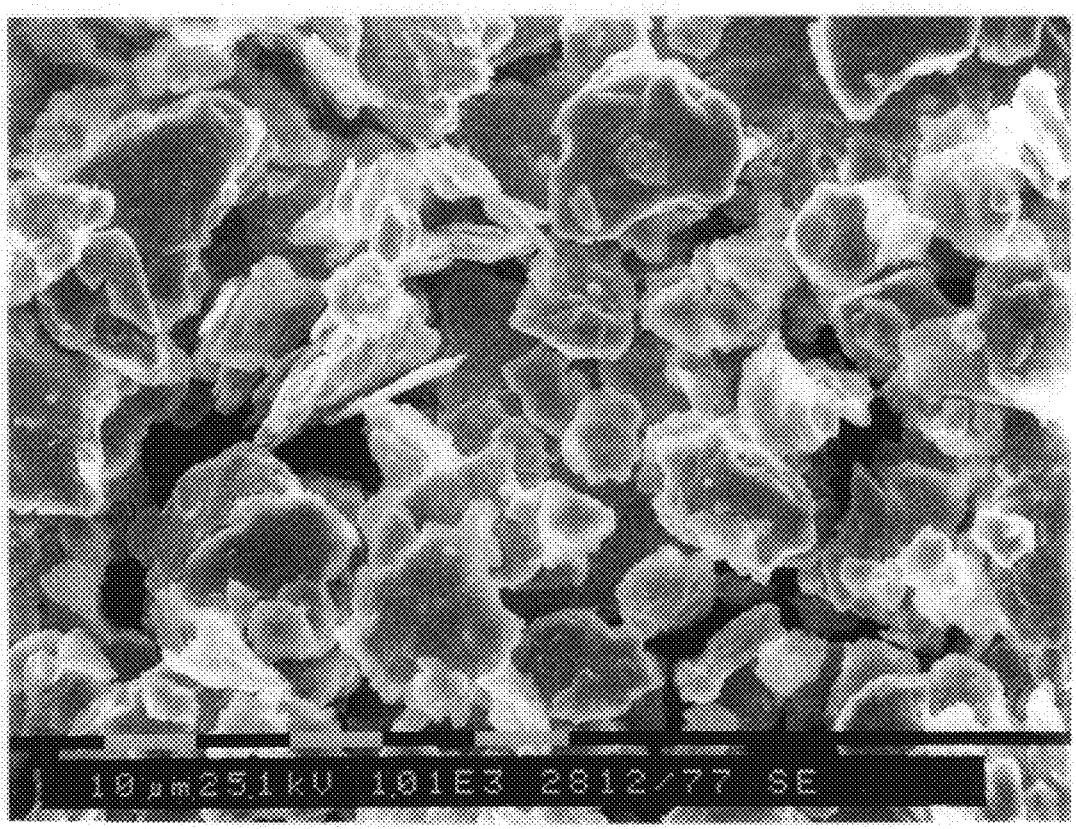
FIG. 1 is a SEM photograph of flake type nickel produced by a method according to the present invention.

FIG. 1 is a photograph of the flake type nickel obtained through the above procedures. As shown in FIG. 1, the flake type nickel exists in the form of a thin film, which indicates that surface area is increased when the flake type nickel is used as additive material of the alloy, that is, the flake type nickel is favorable to modifying the surface.

Figure 2:
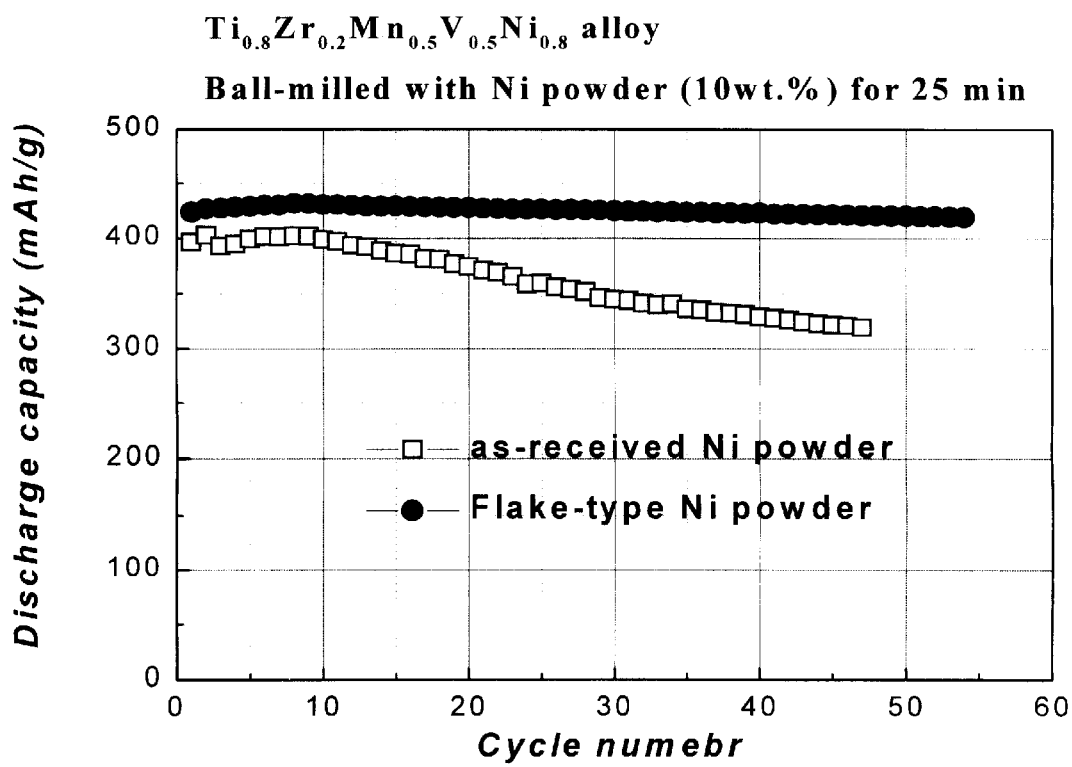
FIG. 2 is a graph comparing electrode cycle life in a case of adding the flake type nickel according to the present invention to a Ti based hydrogen storage alloy with that in a case of adding conventional sphere type nickel to the same alloy.

FIG. 2 shows changes of electrode life duration in cases of using the inventive flake type nickel and the normal sphere type nickel as the additive material during the ball milling.

As seen from the graph of FIG. 2, the normal sphere type nickel begins to degrade since 10 cycles while the flake type nickel does not exhibit distinctive degradation behavior even after 50 cycles. It is known that in the case of Ti based alloy, the degradation is caused by a Ti-oxide film formed on the electrode surface with the progress of cycles.

The above result confirms that the inventive flake type nickel inhibits the electrode from forming the oxide film and so improves surface characteristics of the electrode. This means that alloying on the surface is more effective in the case of using the flake type nickel than in the case of using the sphere type nickel. Because the flake type nickel is produced through the ball milling, it exists in an unstable state, that is, in a state with high energy due to strain inside the nickel. In addition, the flake type nickel has large contact area as seen from FIG. 1. In conclusion, it is said to these two factors facilitate the alloying on the alloy surface in the case of using the flake type nickel over in the case of using the sphere type nickel.

Further, the improvement in the surface characteristics is also accompanied with improvement in all of the electrode performances including an electrode activation characteristic, a high discharge rate characteristic and a charge/discharge efficiency characteristic.

3. Test of Surface Characteristics of a Zr Based Alloy

Figure 3:
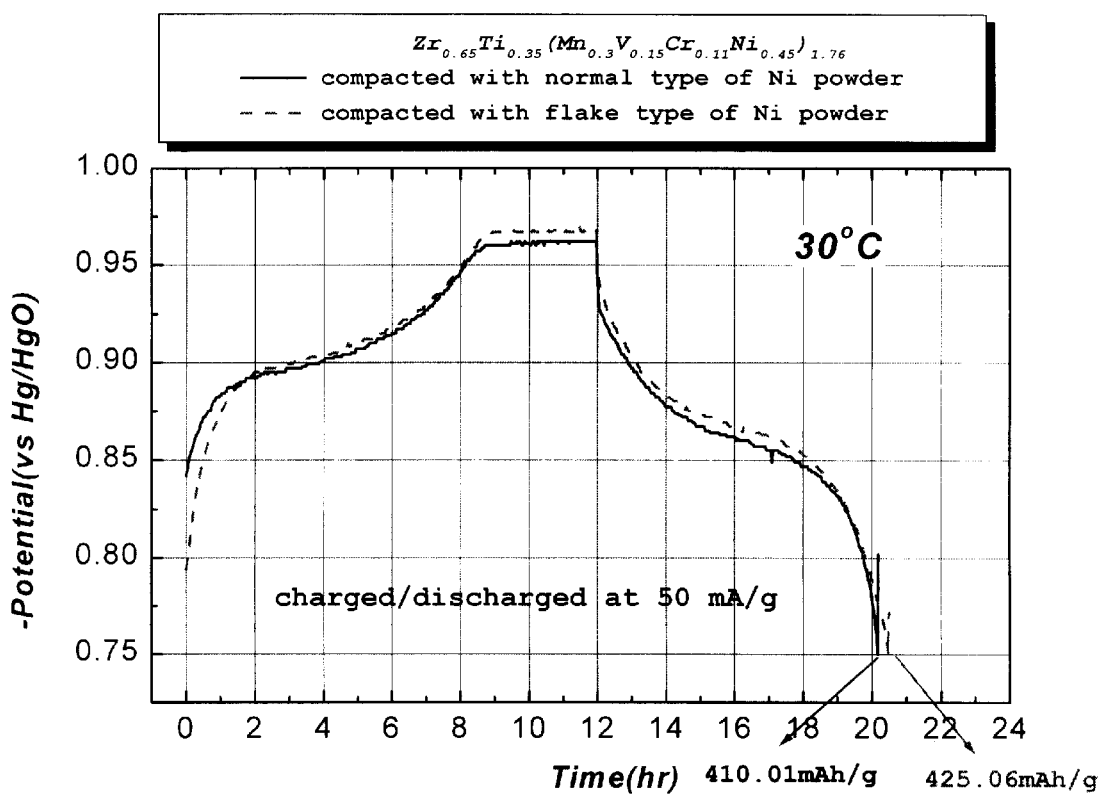
FIG. 3 is a graph representing charge/discharge characteristic curves in cases of using the flake type nickel according to the present invention and the conventional sphere type nickel as compacting material for a Zr based alloy electrode, respectively.

FIG. 3 shows respective charge/discharge characteristic curves in cases of using the inventive flake type nickel and the conventional sphere type nickel as the current collector in producing a $Zr_{0.65} Ti_{0.35} (Mn_{0.3} V_{0.15} Cr_{0.11} Ni_{0.45})_{1.76}$ alloy electrode.

At this time, the electrode was produced as a pellet-type electrode by adding PTFE of 0.02 g as a binder and adding the current collector of 0.3 g to the alloy by the alloy of 0.1 g.

In FIG. 3, it is seen that charge/discharge efficiency and so discharge capacity of the electrode are increased in the case of using the flake type nickel. This result confirms that the flake type nickel can increase the charge/discharge efficiency and thus the discharge capacity due to enhancing efficiency of current collection even if it is used only as the current collector in the production of the electrode without its alloying on the alloy surface. In the end, this indicates that the flake type nickel can serve as an effective current collector not because it is in an unstable state over the sphere type nickel, but because it has increased contact area only.

4. Test of Surface Characteristics of a V—Ti Based Alloy

Figure 4:
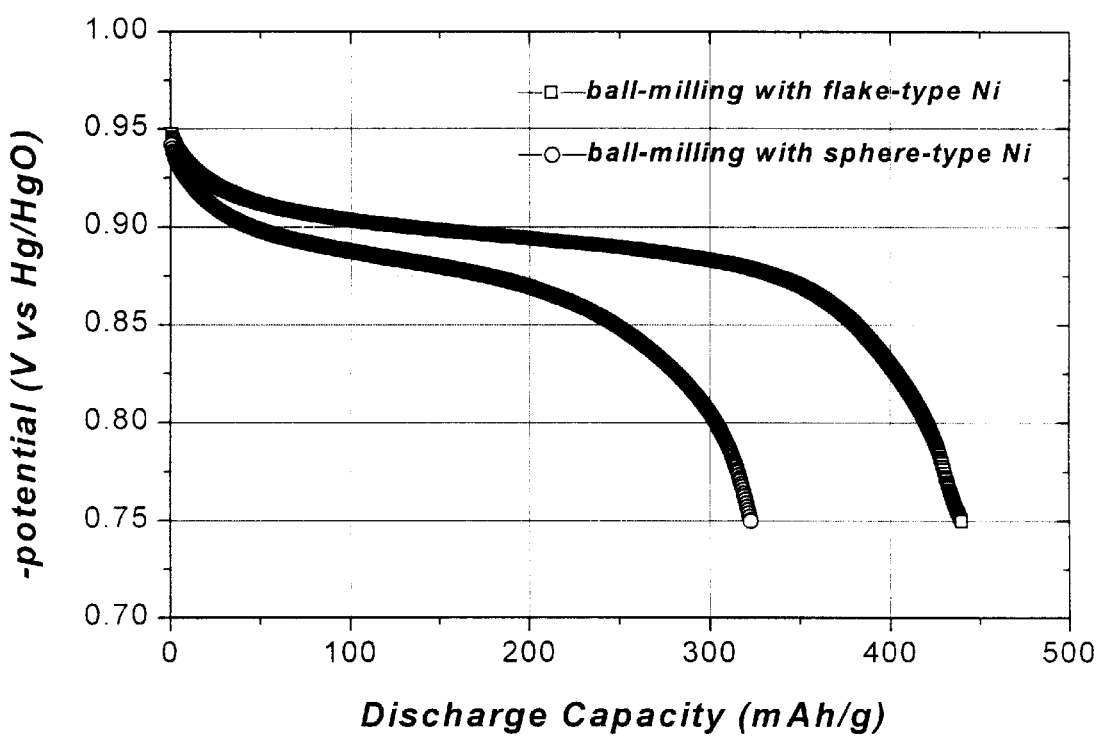
FIG. 4 is a graph representing discharge capacities of a V—Ti based alloy in cases of using the flake type nickel according to the present invention and the conventional sphere type nickel in ball milling, respectively.

FIG. 4 shows respective discharge characteristics in cases of using the inventive flake type nickel and the conventional sphere type nickel in the ball milling for production of a $V_{0.87}Ti_{0.13}$ alloy electrode that has large hydrogen storage capacity, but is unable to charge/discharge in an alkali aqueous solution.

At this time, the ball milling is performed in such a manner that the flake type nickel was added to the $V_{0.87}Ti_{0.13}$ alloy of 3 g in quantity of 10% by weight, a weight ratio between the powder and the balls was adjusted to 6:1 and then the powder was ball-milled for 20 minutes in a SPEX mill. Two Pellet-type electrodes were produced using the respective resulting alloys. The electrode was produced as a pellet-type electrode by adding flake type copper as a current collector to the resulting alloy in quantity of 50% by weight.

In order to enable the alloy to charge/discharge in an electrolyte, nickel must exist on the alloy surface while functioning as a catalyst of the charge/discharge reaction. The ball milling of the flake type nickel efficiently realizes the existence of the flake type nickel on the alloy surface without causing change in the inner structure of the alloy. Thus, larger discharge capacity appears in the case of using the flake type nickel as shown in FIG. 4.

Effects of adding the flake type nickel on performances of the above-mentioned hydrogen storage alloy electrodes are summarized in Table 1 below.

The present invention provides a method for producing a high performance negative electrode for an Ni/MH secondary battery, in which its efficiency is significantly enhanced over the existing method for modifying an electrode surface. Thus, the present invention will contribute to commercializing the above-stated $AB_2$ type and AB type hydrogen storage alloys including V—Ti based alloys that in spite of their large discharge capacity, are not yet applied in practice due to their lower performances in terms of a high discharge rate, a battery withstand voltage characteristic, etc., and accelerate development of an electric motor vehicle in which the high capacity-high performance secondary battery is the key to its commercialization.

TABLE 1

| Division of Alloys | | Discharge Capacity (mAh/g) | Electrode Life Duration (cycle)* | Electrode Life Duration (cycle)** | High Discharge Rate Characteristic (%)*** |
|---|---|---|---|---|---|
| Zr based Alloy | Sphere type Ni | 400 | 300 | 40 | 34 |
| | Flake type Ni | 420 | 400 | 10 | 53 |
| Ti based Alloy | Sphere type Ni | 440 | 150 | — | 20 |
| | Flake type Ni | 440 | 300 | — | 46 |
| V-Ti based Alloy | Sphere type Ni | 340 | 50 | — | 15 |
| | Flake type Ni | 450 | 100 | — | 37 |

*Cycle till $C/C_{max} = 0.8$
**Cycle up $C_{max}$
***$(C_{2c}/C_{c/16}) \times 100$ While the present invention has been illustrated and described under considering preferred specific embodiments thereof, it will be easily understood by those skilled in the art that the present invention is not limited to the specific embodiments, and various changes, modifications and equivalents may be made without departing from the true scope of the present invention.

What is claimed is:

1. A method for modifying a hydrogen storage alloy for an Ni/MH (nickel-metal hydride) secondary battery using flake type metal, the method comprising the steps of:

ball-milling metal powder to produce flake type metal powder; and ball-milling the flake metal powder together with hydrogen storage alloy powder to obtain mixture powder.

2. A method as recited in claim 1, wherein the flake type metal powder is one of kind selected from the group consisting of flake type nickel, flake type copper, flake type palladium and flake type chrome.

3. A method as recited in claim 1, wherein a SPEX mill or an attrition mill is used as the ball mill.

4. A method as recited in claim 1, wherein the hydrogen storage alloy is a Zr based alloy or a Ti-based alloy.

5. A method as recited in claim 1, wherein the flake type metal powder is added as a current collector to the hydrogen storage alloy when an electrode is produced using the hydrogen storage alloy.

6. A method as recited in claim 1, wherein the flake type metal powder is nickel powder.

7. A method as recited in claim 6, wherein the hydrogen storage alloy is a V—Ti based alloy.

* * * * *